United States Patent [19]
Ekman

[11] Patent Number: 4,949,938
[45] Date of Patent: Aug. 21, 1990

[54] CONNECTION ARRANGEMENT

[76] Inventor: Kjell R. Ekman, Aberenrain 43, 6340 Baar, Switzerland

[21] Appl. No.: 351,293

[22] Filed: May 1, 1989

Related U.S. Application Data

[63] Continuation of Ser. No. 141,023, Jan. 5, 1988, abandoned.

[30] Foreign Application Priority Data

Jan. 13, 1987 [SE] Sweden ................................. 8700093

[51] Int. Cl.[5] .............................................. F16L 29/02
[52] U.S. Cl. ................................... 251/149.6; 137/906
[58] Field of Search ....................... 137/614.03, 614.04; 251/149.6, 149.7, 906

[56] References Cited

U.S. PATENT DOCUMENTS

| | | | |
|---|---|---|---|
| 2,545,796 | 3/1951 | Scheiwer | 137/614.03 X |
| 3,498,324 | 3/1970 | Breuning | 137/614.04 |
| 3,636,969 | 1/1972 | Jacobellis | 251/906 X |
| 3,689,025 | 9/1972 | Kiser | 137/906 X |
| 3,791,411 | 2/1974 | Bogeskov et al. | 251/149.6 X |
| 4,086,939 | 5/1978 | Wilcox | 251/149.6 X |
| 4,510,969 | 4/1985 | Rodth | 137/614.04 X |
| 4,674,535 | 6/1987 | de Menibus | 137/614.03 |
| 4,819,692 | 4/1989 | Olson et al. | 137/614.03 |

FOREIGN PATENT DOCUMENTS 636814  2/1962  Canada ............................. 251/149.6

Primary Examiner—Stephen M. Hepperle
Attorney, Agent, or Firm—Pollock, Vande Sande & Priddy

[57] ABSTRACT

Included in a connection arrangement is a valve device (4) which is so arranged as to be capable of longitudinal displacement inside a supporting device (3). During its opening movement the valve device is capable of displacement into a space arranged inside the supporting device, which space is sealed in relation to a fluid capable of connection to the arrangement with the help of the valve device and a sealing device (5a, 5b). An enclosed volume is thus formed with the help of the supporting, valve and sealing devices. Compressible air or gas enclosed within this volume assumes a first pressure with the valve device in its closed position, which first pressure preferably corresponds to atmospheric pressure, and assumes a second pressure which exceeds the first pressure with the valve device in its fully open position, which second pressure is less than the maximum pressure of the fluid. Alternatively, the volume which is sealed in relation to the aforementioned fluid may be in communication with the outside.

11 Claims, 1 Drawing Sheet

CONNECTION ARRANGEMENT

This application is a continuation of Ser. No. 141,023, filed on Jan. 5, 1988 now abandoned.

BACKGROUND OF THE INVENTION

The present invention relates to a connection arrangement which includes a valve device longitudinally displaceable inside a supporting device.

DESCRIPTION OF THE PRIOR ART

A number of connection arrangements of this kine are previously disclosed. In coupling arrangements, for example, a pressure-elimination function was previously provided with the help of a discharge passageway arranged centrally in the valve device. The passageway is activated in conjunction with coupling together or connection through the valve of the passageway is actuated. During this actuation a small quantity of fluid is led away from the connection component, resulting in a pressure-reducing effect, which in turn means that the connection operation can be performed with smaller connection forces.

Pressure-reducing arrangements with an internal valve of this kind complicate the construction and function of the connection arrangement. Difficulties are also encountered in reliably operating pressure-reducing function under every conceivable connection and function situation, which makes a practical connection function difficult or impossible to achieve.

SUMMARY OF THE INVENTION

The present invention proposes an an arrangement which resolves amongst other things, the problem outlined above. The present invention provides a novel way to permit the achievement of comparatively small connection forces.

According to the present invention, novel features include the valve device displaceable during its opening movement into an internal space inside the supporting device, in conjunction with which the volume thus enclosed by the supporting device and the valve device is sealed in relation to the fluid which is capable of being connected to the arrangement.

In a first embodiment the volume encloses a compressible air or gas which, with the valve device in its closed position, assumes a first pressure, preferably atmospheric presusre. With the valve device in its fully open position the air or the gas assumes a second pressure which exceeds the first pressure, but which is less than the maximum pressure of the fluid.

In another embodiment of the present invention those parts of the valve device which extend outside the supporting device are so arranged that the valve device, in conjunction with its initial displacement movement, will not produce any compression of the fluid present inside the arrangement. This can be achieved by the part of the valve device which extends outside the supporting device exhibiting essentially the same circumference/diameter dimensions. In a preferred embodiment the second pressure shall exceed the first pressure by 0.3–8.0 bar, and preferably by 0.5–2.0 bar.

In one embodiment the supporting device includes of a tubular center part which supports the valve device. The supporting device is centered in the internal space of the arrangement with the help of wing-shaped supporting elements, which can be two or more in number.

The space for the fluid in the arrangement extends beyond the tubular center part and between the wing-shaped elements. The supporting device consists of an attachment component for the tubular center part and for the wing-shaped elements. In a preferred embodiment the valve device includes a component in the form of a hollow cylinder, the internal space of which constitutes a part of the enclosed volume. The valve device is caused to move from its closed position towards the open position against the effect of a spring device arranged inside the internal spaces of the supporting and valve devices which form the volume. The valve device can also be provided at its free end with a part of uniform thickness which, with the valve device in its closed position, extends past a seal arranged in the arrangement. The receiving volume/receiving space of the supporting device exceeds the sealing volume of the valve device close to the sealing device for the connection arrangement in relation to the valve device which must be introduced into the connection arrangement in order for the fluid to be capable of passing between the sealing device and the valve device. The tubular center part can also be provided with an internal stop surface which, in the second position, is capable of interacting with an end surface of the valve device.

In an alternative embodiment the internal space enclosed and sealed with the help of the valve device and the sealing device is in contact with the outside of the connection arrangement through a communicating channel.

The present invention device allows to produce the opening movement with comparatively small opening forces, in spite of the comparatively high fluid pressure. In the case of high maximum fluid pressures the pressure inside the volume must be less than the fluid pressure by a considerable margin. In this way the opening function can be made essentially independent of the level of the fluid pressure. A fluid-compressing movement on opening the valve device is avoided through the proposed specific design of the valve device. In the case of the presence of a communication between the enclosed internal space and the outside of the arrangement, the pressure can be kept essentially constant inside the internal space irrespective of the open and closed positions of the valve arrangement.

A space-saving construction is also obtained through the proposed construction, which means that the dimensions of the connection arrangement can be kept down with regard to both length and diameter.

BRIEF DESCRIPTION OF THE DRAWINGS

A preferred embodiment of a connection arrangement which exhibits significant characteristic features for the invention is described below with simultaneous reference to the accompanying drawing, in which.

DETAILED DESCRIPTION OF THE PREFERRED EMBODIMENT

Figure 1:
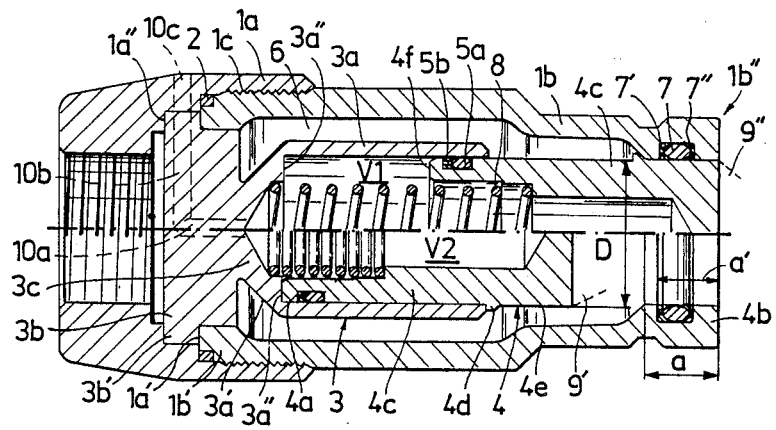
FIG. 1 shows in longitudinal section a coupling component, for example a quick-coupling component, in conjunction with which one half of the Figure shows the valve device in its fully open position and the other half of the Figure shows the valve device in its fully closed position.

A coupling component 1 in accordance with the Figures includes a male coupling component, for example belonging to a quick-coupling, which is connectable to a corresponding female coupling component (female quick-coupling component). For the sake of clarity only those parts of the coupling are shown which are affected by the present invention. Thus, for example, the functions and the components for the coupling together and the holding together of the coupling components are not shown, and these can be executed in a manner known in the art.

The male coupling component 1 includes a first casing component 1a and a second casing component 1b. The casing components are screwed together through threads 1c and are locked to one another in a previously disclosed manner. A seal 2 seals the casing components in relation to one another.

A supporting device 3 is clamped between the components 1a and 1b. The supporting device includes of a tubular center part 3a and wing-shaped elements 3b centring it, the number of which elements may vary from at least two upwards. The supporting device includes of an attachment component 3c, to which the tubular center part and wing-shaped elements are connected. The part 3a exhibits at its rear a tapering component 3a', through which the part 3a is connected to the part 3c. The wing-shaped elements exhibit radial projecting components 3b', by means of which axial and radial securing of the supporting device in the coupling component is achieved. The end part 1b' of the casing component 1b interacts with the projecting components 3b' and an abutment surface 1a' arranged close to it internally inside the casing component 1a. The seal 2 is arranged adjacent to the abutment surface. The projecting components 3b' interact with a part of the lower edges of the wing-shaped elements, and also with an additional abutment surface 1a" inside the casing component 1a.

A valve device 4 is supported in such a way that it is capable of longitudinal displacement in the tubular center part 3a. One half of the longitudinal section shows the valve device in its fully closed position, and the other half of the longitudinal section shows the valve device in its fully open position.

The supporting device encloses, together with the valve device, a variable volume, indicated by V1 and V2 in FIG. 1. The volume space is sealed against the fluid which is capable of being connected to the coupling component by means of a sealing device which, in the illustrative embodiment, consists of a conventional elastic 'O'-ring seal 5a and a so-called back-up seal 5b of a previously disclosed kind. In the example illustrated here the device 4 is provided with a recess 4a for the seal. A particular characteristic feature of this seal is that it is required to remain tight against the pressure difference between the air and the gas enclosed in the volume V1, V2 and the fluid connected by the coupling component, the allocated space 6 for which extends along, amongst other things, the valve device 4 and the centre part 3a, and between the wing-shaped elements 3b. The sealing device 5a, 5b may alternatively be arranged in a recess on the inside of the centre part 3a.

The valve device includes of a front sealing component 4b capable of interacting with a sealing device 7 at the free end 1b" of the coupling component. Also included is a supporting component 4c which can be pushed in and out of the supporting device, which is in the illustrative embodiment in the form of a hollow cylinder. The internal space of the hollow cylinder constitutes a part of the volume V1, V2 when the valve device is pushed out fully or partly from the internal space of the supporting device. With the valve device in its fully inserted position, the hollow space extends into the internal space of the supporting device and into close proximity with (on a level with) or past an imaginary end plane through the free end of the center part 3a. In this case the space inside the hollow cylinder constitutes a part of the volume. The valve device is caused to move from the closing position to the opening position against the effect of a spring device 8 which, in the illustrative embodiment, has the form of a coil spring with an external diameter preferably of more than about 8 mm. The spring device is so arranged as to permit actuation of the valve device to its fully open position, but without the coupling force for the coupling components in question being increased significantly for this reason. The spring device is also so arranged as to be capable of returning the device reliably into its closed position after actuation of the valve device has ceased.

The pressure exerted on the air/gas inside the volume (V1) with the valve device in its fully closed position is referred to here as the first pressure, which preferably corresponds to atmospheric pressure.

The pressure exerted on the air/gas inside the volume (V2) in the fully open position is referred to here as the second pressure, which exceeds the first pressure by between 0.3–8.0 bar, and preferably by between 0.5–2.0 bar, that is to say the pressure inside the volume can assume values within the range 1.3–9.0 bar and 1.5–3 bar respectively. These values are normally significantly below the maximum fluid pressure which arises inside the coupling component (which may, for example, be arranged for a fluid pressure of 400 bar or more).

The internal space of the supporting device 3a is selected so that it exceeds the maximum valve device volume (the rotation volume) introduced into the internal space by 5–50%, which means that the aforementioned pressure can be contained by couplings which are practically feasible from the point of view of their length and diameter.

The valve device 4 is provided with a retaining device 4d for obtaining a distinct closing position. The retaining device may consist of one or more heels distributed evenly around the periphery of the valve device, or alternatively may consist of a flange running all the way around. With the exception of these projecting retaining devices, the valve device has essentially the same diamter D or external dimension along its entire length, that is to say along both that part which is situated outside the supporting device and that part which is situated inside the internal space of the supporting device. The uniformly thick enclosing surface 4e of the valve device extends in the closing position past the seal(s) 7 ('O'-ring) and 7', 7" (back-up). Due to the uniformly thick enclosing surface 4e, no compression movement is exerted on the fluid as the valve device is opened, and the valve device is capable of being displaced in it. As the valve device is pushed in, fluid is able to move from one side of the retaining device to its other side.

The retaining device can also be utilized in order to produce a distinct, fully open position for the valve device. Use may be made in addition or alternatively of an internal stop surface 3a" and a hand surface 4f capable of interacting with it in the fully open position.

A lifting body in a coupling component which is compatible with the coupling component shown here is designated by 9', 9" in FIG. 1. The purpose of the lifting body is to guide the valve device 4 into the coupling component. A first sealing distance is indicated by a, and a second sealing distance is indicated by a'. When the valve device is fully closed, its sealing component will exhibit a length which corresponds to the distance a or a'. The volume of the sealing component (which is equal to cross-sectional area x length a/a') represents the volume which must be pushed into the coupling component before the fluid begins to flow from the fluid space of the coupling component through the valve device and the sealing device 7 of the coupling component. The space in the supporting device for accommodating the valve device must exceed the sealing volume of the valve device. In one embodiment the accommodating space exceeds the sealing volume by 5–50%.

In one embodiment, one or more communicating channels is/are arranged between the internal volume space V2 and the outside of the coupling component. In this case the pressure inside the internal space can be made essentially independent of the longitudinally displaced position of the valve device 4. The internal volume space V1, V2 is in communication with the pressure surrounding the coupling, for example the pressure of the atmosphere. It is possible, for example, by the application of a controllable/variable pressure to the outside of the coupling, to make a contribution to the opening and closing forces for the valve device. The pressure inside the internal space assumes a value which corresponds to the pressure of the surrounding environment. A valve device may be arranged inside the communicating channel(s). The opening of the communicating channel to the outside of the coupling is arranged preferably in such a way that the ingress of dirt, dust and liquid, etc., is prevented. Represented in FIG. 1 is a communicating channel with an axial bore 10a and a radial bore 10b in the supporting device, and with a radial bore 10c in the component 1a. The communicating channel is sealed from the fluid pressure of the connection arrangement. Sealing can be provided, for example, by means of a tubular device (not shown) which extends fully or partially into the parts 10b and 10c of the communicating channels and which is sealed on its outside against the components 1a and 3b, for example with adhesive or LOCTITE, etc.

Figure 2:
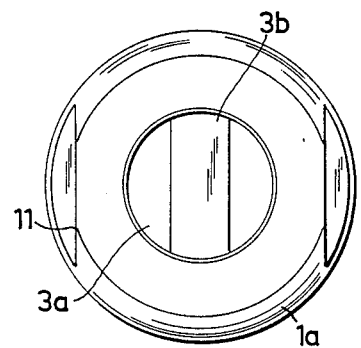
FIG. 2 shows an end view of the coupling component in accordance with FIG. 1.

A means for the application of a spanner is indicated by the designation 11 in FIG. 2.

A connection arrangement which, connected together with the compatible coupling component 9, provides a fluid passageway through a displacement of the valve device 4 achieved as a result of this connection. The valve is displaced from a closed position to an open position. In the closed position a fluid pressure capable of being enclosed in the arrangement, in the space 6 situated outside the valve device, is effective against the outside of the valve device. In the open position the fluid passageway is effected between the space 6 and the compatible coupling component 9, which can be of a previously known kind and may consist, for example, of a male component forming part of a quick-coupling component. The coupling component in accordance with the Figures in this case consists of the female component of the quick-coupling component.

The valve device consists of free parts 4e exposable to the fluid pressure, which project outwards from the supporting space situated inside the supporting component 3a and are sealed from the fluid pressure by means of seals 5a, 5b, in order to permit interaction in the closed position with the front sealing devices 7, 7', 7". The free parts are so arranged, during displacement from the closed position, as to provide an essentially or entirely unrestricted, compression-free initial movement for the fluid which effects the fluid pressure inside the space 6 outside the valve device, together with a connecting force which is essentially independent of the fluid pressure and is capable of being determined in the first instance by means of a return function for the valve device effected with a spring force applied inside and/or outside the supporting space.

The valve device is so arranged that the fluid pressure inside the space 6 is prevented from producing a resulting force acting essentially counter to the opening force for the valve device when the valve device is moved from the closed position towards the opening position, at least until such time as the fluid pressure is discharged through the seal.

The invention is not restricted to the embodiment illustrated above by way of example, but may undergo modifications within the scope of the following Patent Claims and the idea of invention.

I claim:

1. A fluid connecting arrangement for coupling components forming a passageway for passing fluid therethrough, comprising:

a supporting device including a tubular center part, and at least one wing-shaped support element for centering said supporting device inside the fluid passageway formed in a coupling component;

a valve member longitudinally displaceable in said tubular center part of said supporting device between an open and a closed position of said valve member;

said valve member having a substantially uniform, solid outer wall with a substantially continuous wall surface and a substantially uniform outer diamter along its length; said valve member having a rear portion extending outside said tubular center part;

a first sealing means positioned between a front portion of said valve member and said tubular center part of said supporting member;

a first, internal, variable space sealingly defined inside said tubular center part and said longitudinally displaceable valve member;

a second space formed in the passageway for passing the fluid in the coupling, said second space extending between an inner wall of said coupling component, the outer wall of said extending portion of said valve member and the outer wall of said tubular center part; and a second, elongated sealing means provided between the inner wall surface of said coupling component and the end part of the outer wall of said rear extending portion of said valve member, said second sealing means including a seal positioned in the inner wall of said coupling component;

said second, elongated sealing means forming a sealing distance in a closed position of said valve member;

wherein said valve member being longitudinally displaceable into said first, internal, variable space, at a distance corresponding to said sealing distance, substantially without causing compression of the fluid in said second space during an initial lifting movement, before activation of the passage of the fluid past said second sealing means.

2. An arrangement according to claim 1, wherein compressible air or gas enclosed within a volume, which is formed in said first, internal space assumes a first pressure, corresponding to the atmospheric pressure with said valve member being in its closed position, and wherein said air or gas assumes a second pressure which exceeds the first pressure with said valve member being in its fully open position, the second pressure being less than the maximum pressure of the fluid.

3. An arrangement according to claim 2, further comprising retaining means provided along the outer periphery of said valve 4. An arrangement according to claim 2, wherein said valve member includes a hollow, cylindrical part defining therein a part of the volume, and a spring device arranged inside the volume, which endeavors to return said valve member towards its closed position.

5. An arrangement according to claim 2, wherein said first internal space is at least equal to a sealing volume of said valve member which is defined by said sealing distance and the inner diameter of said coupling component along said sealing distance and which has to be moved inwardly into said internal space before the fluid is permitted to pass said second sealing means.

6. An arrangement according to claim 2, wherein said first internal space is up to 50% larger than a sealing volume of said valve member which is defined by said sealing distance and the inner diameter of said coupling component and which has to be moved inwardly into said first internal space before the fluid is permitted to pass said second sealing means.

7. An arrangement according to claim 3, wherein said valve member includes a hollow, cylindrical part, the internal space of which constitutes a part of the volume, and wherein a spring device is positioned inside the volume which endeavors to return said valve member towards its closed position.

8. An arrangement according to claim 1, wherein said first internal space is in communication with the outside of the arrangement through at least one channel.

9. An arrangement according to claim 2, wherein said first internal space is in communication with the outside of the arrangement through at least one channel.

10. An arrangement according to claim 5, wherein said first internal space is in communication with the outside of the arrangement through at least one channel.

11. An arrangement according to claim 4, wherein said first internal space is at least equal to a sealing volume of said valve member, which is defined by said sealing distance and the inner diameter of said coupling component along said sealing distance and which has to be moved inwardly into said internal space before the fluid is permitted to pass said second sealing means.

* * * * *